United States Patent
Leanza et al.

(10) Patent No.: US 9,259,998 B1
(45) Date of Patent: Feb. 16, 2016

(54) VEHICLE BODY STRUCTURE

(71) Applicant: Honda Motor Co., Ltd., Tokyo (JP)

(72) Inventors: Anthony John Leanza, Powell, OH (US); Manabu Ishizono, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/518,002

(22) Filed: Oct. 20, 2014

(51) Int. Cl.
*B60K 1/04* (2006.01)
*B62D 21/03* (2006.01)
*B62D 21/15* (2006.01)
*B62D 25/20* (2006.01)

(52) U.S. Cl.
CPC . *B60K 1/04* (2013.01); *B62D 21/03* (2013.01); *B62D 21/155* (2013.01); *B62D 25/20* (2013.01); *B60K 2001/0438* (2013.01)

(58) Field of Classification Search
CPC .......... B60K 1/04; B62D 21/02; B62D 21/03; B62D 21/155; B62D 25/20
USPC ................ 296/37.14, 184.1, 187.03, 187.08, 296/187.09, 193.07, 204, 205; 180/68.5
See application file for complete search history.

(56) References Cited

U.S. PATENT DOCUMENTS

| | | | |
|---|---|---|---|
| 5,501,289 A | 3/1996 | Nishikawa et al. | |
| 6,085,854 A * | 7/2000 | Nishikawa | B60K 1/04 180/68.5 |
| 6,227,322 B1 | 5/2001 | Nishikawa | |
| 7,051,825 B2 | 5/2006 | Masui et al. | |
| 7,540,343 B2 * | 6/2009 | Nakashima | B60K 1/00 180/65.1 |
| 7,914,942 B2 | 3/2011 | Kato et al. | |
| 8,585,132 B2 | 11/2013 | Klimek et al. | |
| 8,646,830 B2 | 2/2014 | Hettinger et al. | |
| 8,672,354 B2 | 3/2014 | Kim et al. | |
| 8,689,919 B2 | 4/2014 | Maeda et al. | |
| 8,814,255 B2 * | 8/2014 | Yamaji | B62D 25/20 296/193.07 |
| 2012/0055725 A1* | 3/2012 | Mizoguchi | B60K 1/04 180/68.5 |
| 2012/0097466 A1 | 4/2012 | Usami et al. | |
| 2012/0161472 A1* | 6/2012 | Rawlinson | B60K 1/04 296/187.08 |
| 2014/0117716 A1* | 5/2014 | Patberg | B62D 21/157 296/187.08 |
| 2014/0338999 A1* | 11/2014 | Fujii | B60K 1/04 180/68.5 |

\* cited by examiner

*Primary Examiner* — Jason S Daniels
(74) *Attorney, Agent, or Firm* — Rankin, Hill & Clark LLP

(57) ABSTRACT

A vehicle body includes first and second side rails, a first cross member and a second cross member. A multi-piece well configured to house hybrid electronic hardware includes a well floor having a first side, a second side, a first end, and a second. The first end is secured to the first cross member to define a well first end wall. The second end is secured to the second cross member to define a well second end wall. A first frame side support is secured to the first side to define a well first side wall. A second frame side support is secured to the second side to define a well second side wall. The first frame side support is laterally spaced inwardly from and connected to the first side rail and the second frame side support is laterally spaced inwardly from and connected to the second side rail.

17 Claims, 5 Drawing Sheets

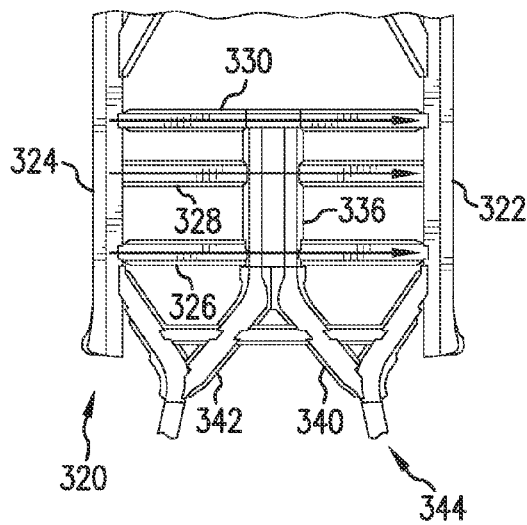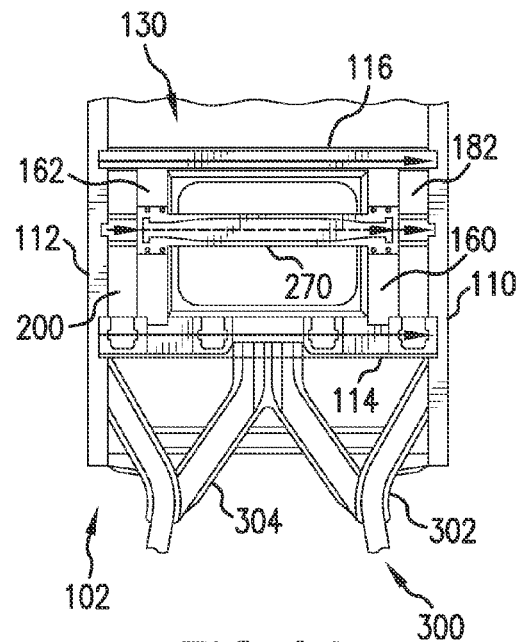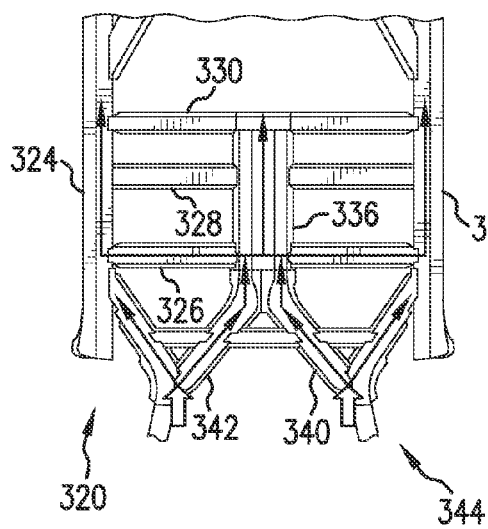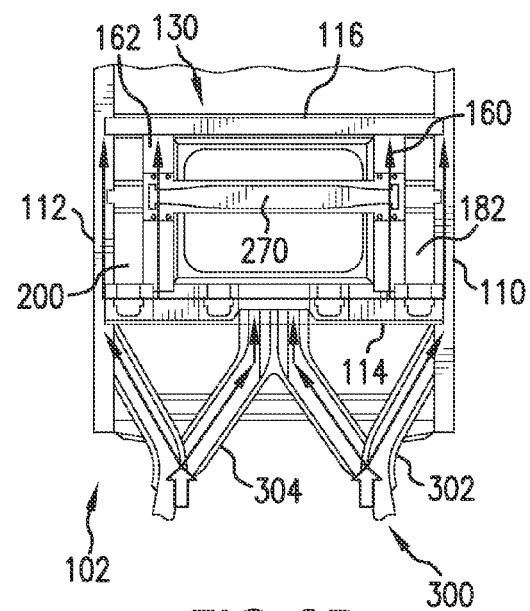
FIG.5A  FIG.6A
FIG.5B  FIG.6B

VEHICLE BODY STRUCTURE

BACKGROUND

As is well known in the art, a hybrid vehicle operates using an output of both an internal combustion engine and an electric motor and an electric vehicle operates only on the output of an electric motor. For each of these vehicles, packing configurations for associated hybrid electronic hardware tend to compromise interior volume, fuel tank volume, and cargo space. Therefore, it is known to install the hybrid electronic equipment in a box-shaped structure or well (typically formed as a one-piece, deep-drawn part) mounted beneath a vehicle body floor. However, with this mounting location of the housing structure, work performed on the hybrid electronic equipment must be carried out from below relative to the vehicle body floor, which can adversely affect an associate's working efficiency. Further, because the structure is supported beneath the vehicle body floor, the known housing structure can be compromised by a vehicle impact, which, in turn, can cause a failure of the hybrid electronic equipment.

BRIEF DESCRIPTION

In accordance with one aspect, a vehicle body comprises a pair of laterally spaced longitudinal first and second side rails, a first cross member and a second cross member longitudinally spaced from the first cross member. Each of the first and second cross members spans between and interconnects the first and second side rails. A multi-piece well configured to house associated hybrid electronic hardware includes a well floor having a first side, a second side laterally opposite the first side, a first end, and a second end longitudinally opposite the first end. The first end is secured to the first cross member to define a first end wall of the well. The second end is secured to the second cross member to define a second end wall of the well. A first frame side support is secured to the first side of the well floor to define a first side wall of the well. A second frame side support is secured to the second side of the well floor to define a second opposite side wall of the well. The first frame side support is laterally spaced inwardly from and connected to the first side rail and the second frame side support is laterally spaced inwardly from and connected to the second side rail.

In accordance with another aspect, a multi-piece well for a vehicle body configured to house associated hybrid electronic hardware comprises a well floor having a first side, a second side laterally opposite the first side, a first end, and a second end longitudinally opposite the first end. A first frame end support is secured to the first end of the well floor and a second frame end support is secured to the second end of the well floor. The first and second frame end supports define opposite end walls of the well. End portions of each of the first and second frame end supports are connected to respective first and second side rails of the vehicle body. A first frame side support is secured to the first side of the well floor and the first side rail and a second frame side support secured to the second side of the well floor and the second side rail. The first and second frame side supports define opposite side walls of the well. End portions of each of the first and second frame side supports are connected to the first and second frame end supports. A separate support component spans over an opening defined by the well, and end portions of the support component are releasably fastened to the first and second frame side supports.

In accordance with yet another aspect, a method for forming a vehicle frame comprises providing a pair of laterally spaced longitudinal first and second side rails; connecting a first cross member to the first and second side rails; connecting a second cross member to the first and second side rails; and forming a well on the vehicle frame, the well including a well floor, first and second end walls and first and second side walls. The forming step includes securing a first end of the well floor to the first cross member wherein the first cross member defines the first end wall of the well, and securing a second end of the well floor to the second cross member wherein the second cross member defines the second end wall of the well. The forming step further includes securing a first frame side support to a first side of the well floor wherein the first frame side support defines the first side wall of the well, connecting the first frame side support to the first and second cross members, securing a second frame side support to a second side of the well floor wherein the second frame side support defines the second side wall of the well, and connecting the second frame side support to the first and second cross members. The forming step further includes fastening a support component to the first and second frame side supports such that the support component spans over the well floor. The method further comprises connecting the first frame side support to the first side rail; and connecting the second frame side support to the second side rail.

BRIEF DESCRIPTION OF THE DRAWINGS

FIGS. 5A and 5B depict transfer of an impact load to a known vehicle body caused by a respective side collision and a frontal collision.

FIGS. 6A and 6B depict transfer of an impact load to the exemplary vehicle body caused by a respective side collision and a frontal collision.

DETAILED DESCRIPTION

It should, of course, be understood that the description and drawings herein are merely illustrative and that various modifications and changes can be made in the structures disclosed without departing from the present disclosure. In general, the figures of the exemplary vehicle body structure are not to scale. As used herein, lateral directions are transverse across the vehicle body, i.e., left and right directions. Likewise, longitudinal directions refer to forward and rearward directions of vehicle travel, and the vertical directions relate to elevation, i.e., upward and downward directions. It will also be appreciated that the various identified components of the exemplary vehicle body structure disclosed herein are merely terms of art that may vary from one manufacturer to another and should not be deemed to limit the present disclosure.

Figure 1:
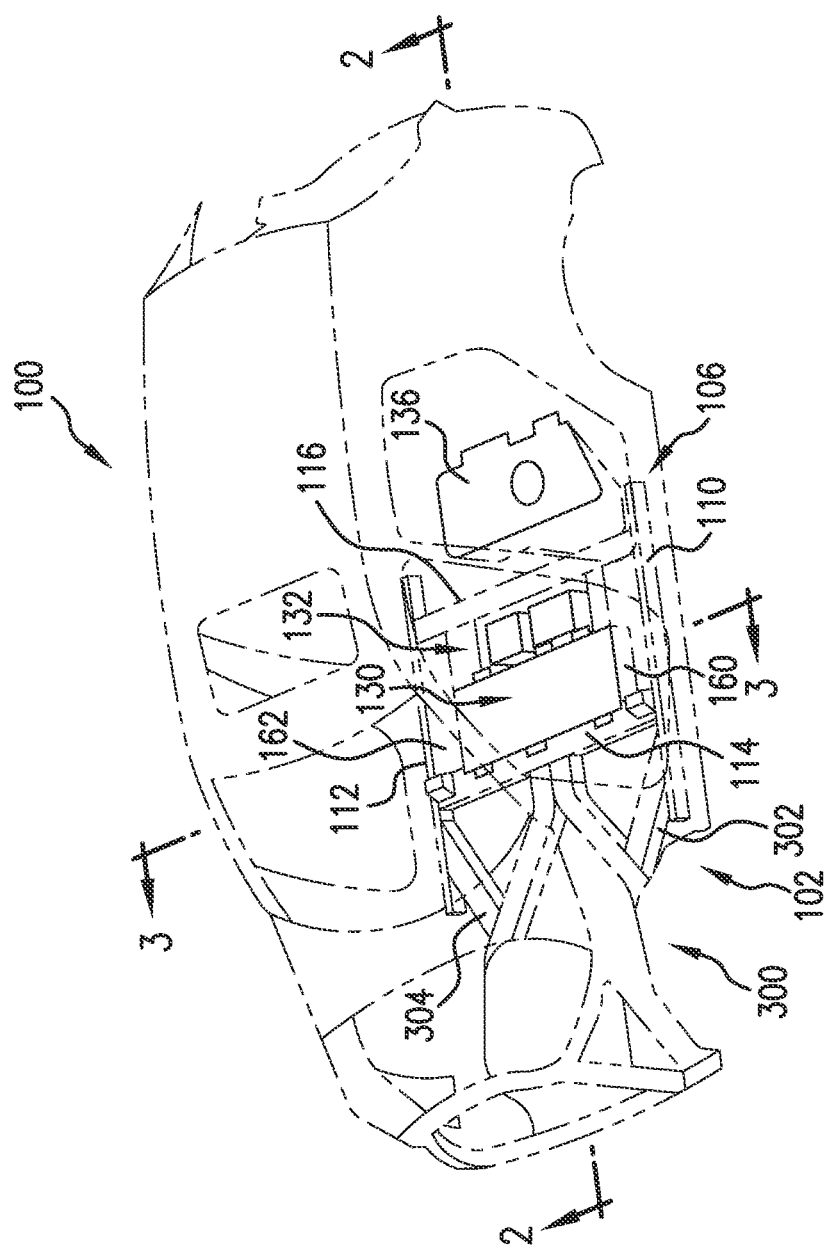
FIG. 1 is a schematic view of a vehicle body including hybrid electronic equipment housed in an exemplary multi-piece well mounted beneath a vehicle body floor.
Figure 2:
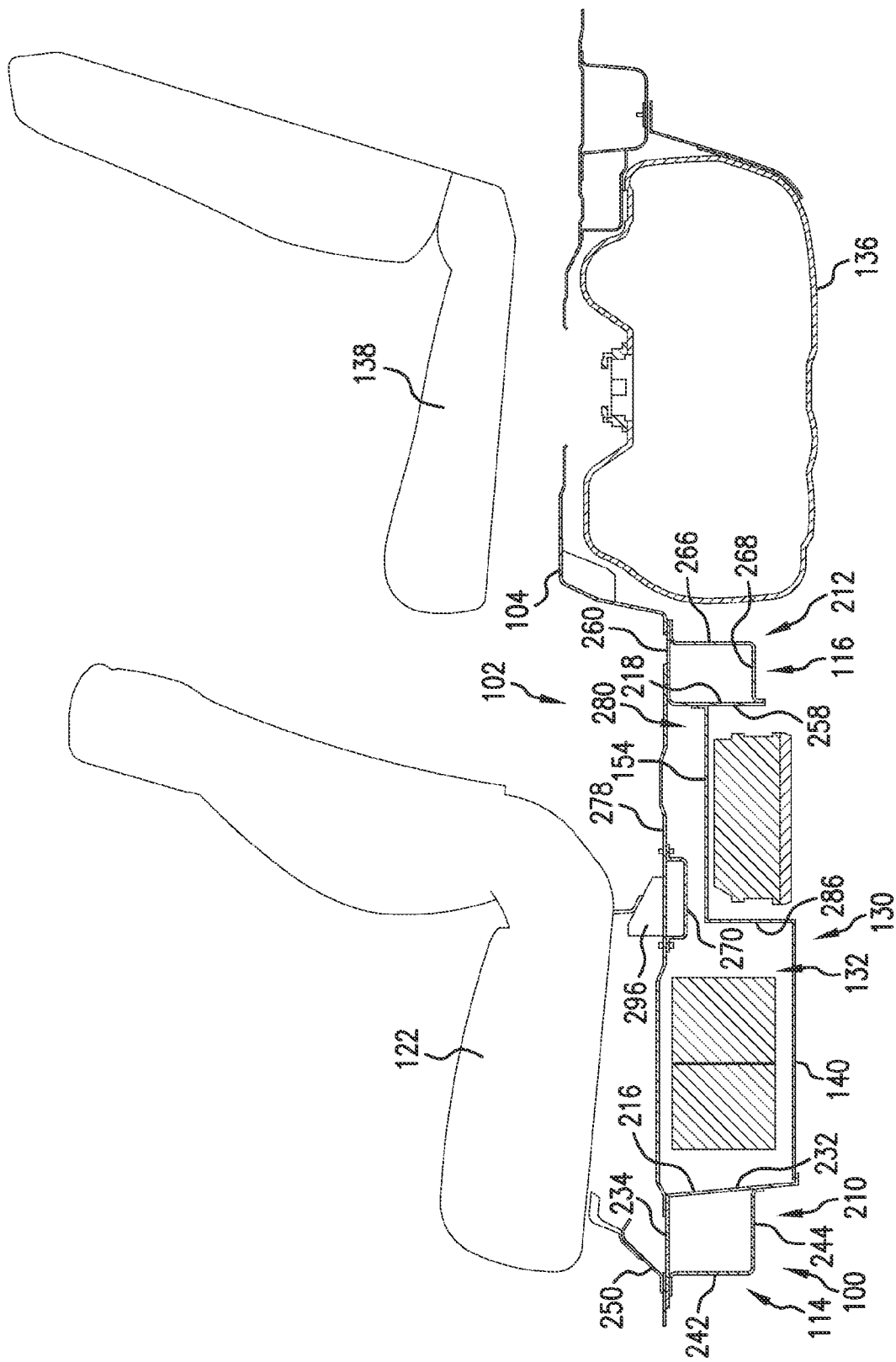
FIG. 2 is a cross-sectional view of the multi-piece well taken along line 2-2 of FIG. 1.
Figure 3:
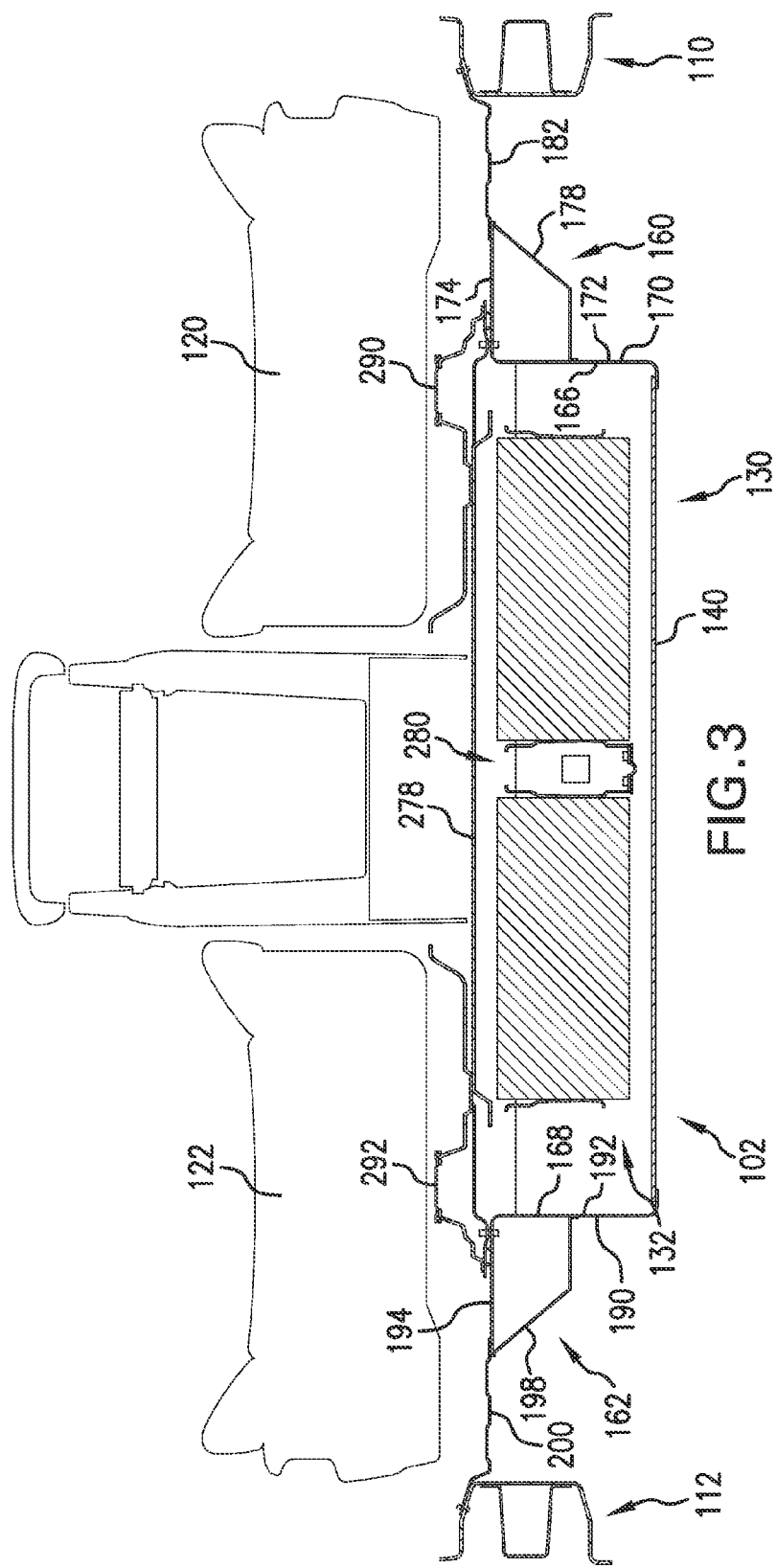
FIG. 3 is a cross-sectional view of the multi-piece well taken along line 3-3 of FIG. 1.

Referring now to the drawings, wherein like numerals refer to like parts throughout the several views, FIGS. 1-3 schematically illustrate a vehicle body 100 having an exemplary vehicle frame structure 102. The vehicle frame structure 102 is described for use with a sports utility vehicle (SUV) platform, though this is merely illustrative and it is to be appreciated by those skilled in the art that the vehicle frame structure could easily be adapted to other vehicle platforms, such as minivans, vans, sedans, crossovers, etc. The vehicle floor structure 102 includes a floor 104 connected to a main frame assembly 106. The main frame assembly 106 includes first and second longitudinal members or side rails 110, 112 with first and second lateral cross-members 114, 116, respectively that span between and interconnect the longitudinal side rails 110, 112. It should be appreciated that each of the first and second side rails 110, 112 can have a common cross-sectional profile that remains constant along at least a longitudinal portion thereof, and in the present disclosure, each of the first and second rails can be formed in a channel or a U sectional shape. The lateral first and second cross-members 114, 116 can be shaped similar to the first and second side rails 110, 112. In the depicted vehicle platform of FIG. 1, the area beneath the associated front row of seats 120, 122 includes an exemplary multi-piece housing or structural well 130 according to the present disclosure. The multi-piece well 130 is configured to house associated hybrid electronic equipment/hardware 132 for the vehicle. Therefore, the hybrid electronic equipment/hardware 132 is mounted in a body structure at least partially defined by the vehicle frame structure 102, and this body structure is located below the vehicle floor 104 under the first row of seats 120, 122. This location of the hybrid electronic equipment/hardware 132 does not compromise interior volume, fuel tank volume and/or cargo space of the vehicle. By way of example, a fuel tank 136 can be mounted beneath the vehicle floor 104 behind the front row of seats and the exemplary multi-piece well 130 and beneath a second row of seats 138.

Figure 4:
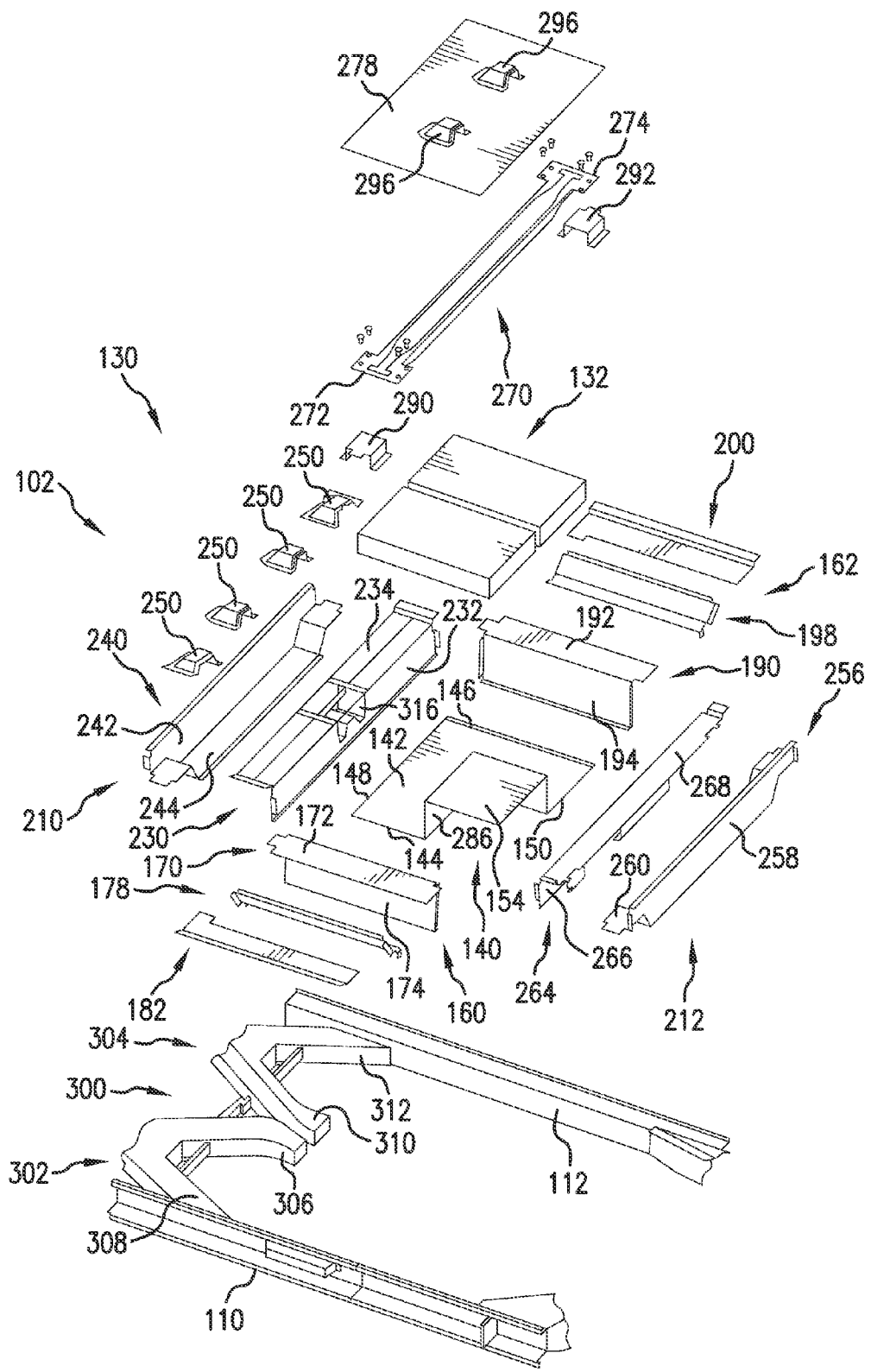
FIG. 4 is an exploded view of the multi-piece well of FIG. 1.

FIGS. 2-4 illustrate the structural components of the vehicle frame structure 102 that form the multi-piece structural well 130 for the vehicle body 100. The multi-piece well 130 includes a well floor 140 which is defined by a substantially planar base 142. The base 142 includes a first side 144 and a second side 146 opposite the first side 144 in a lateral direction of the vehicle body 100. The base 142 further includes a first end 148 and a second end 150 opposite the first end 148 in a longitudinal direction of the vehicle body 100. A raised platform 154 can be provided on the base 142 of the well floor 140; although, this is not required. As shown, the platform 154 is located at the intersection of the first side 144 and the second end 150 of the base 142. However, it should be appreciated that if so provided on the well floor 140, the platform 154 can be located elsewhere on the base 142. The multi-piece well 130 further includes a first frame side support 160 and a second frame side support 162 located opposite the first frame side support in a lateral direction of the vehicle body 100. As depicted, the first frame side support 160 is separate from the well floor 140 and is secured to the first side 144 of the well floor base 142. The second frame side support 162 is also separate from the well floor 140 and is secured to the second side 146 of the well floor base 142. The first and second frame side supports 160, 162 define opposite side walls 166, 168 of the multi-piece well 130 (FIG. 3). Further, as shown in FIG. 3, the first frame side support 160 is configured to be secured to one of the side rails (i.e., first side rail 110) along a length of the first frame side support, and the second frame side support 162 is configured to be secured to the other of the side rails (i.e., second side rail 112) along a length of the second frame side support.

Particularly, the first frame side support 160 includes a first support member 170 being L-shaped in cross-section and having a first portion 172 defining one of the side walls of the well 130 (i.e., side wall 166) and a second portion 174. A second support member 178 of the first frame side support 160 can be L-shaped in cross-section and is configured to interconnect the first and second portions 172, 174 of the first support member 170. With the configurations of the first support member 170 and second support member 178, the first frame side support 160 defines an elongated open-ended, generally box-shaped structural support component for both the well 130 and the vehicle body 102. End sections of the first frame side support 160 are directly secured to the first and second cross member 114, 116. As best shown in FIGS. 3 and 4, the first frame side support 160 is laterally spaced inwardly from and connected to the first side rail 110. To this end, according to one aspect, a third support member 182 of the first frame side support 160 is secured to the first portion 172 of the first support member 170. The third support member 182 interconnects the first side rail 110 and the first portion 172 and bridges a gap between the first side rail 110 and the side wall 166 of the well 130.

Similarly, the second frame side support 162 includes a first support member 190 being L-shaped in cross-section and having a first portion 192 defining one of the side walls of the well 130 (i.e., side wall 168) and a second portion 194. A second support member 198 of the second frame side support 162 can be L-shaped in cross-section and is configured to interconnect the first and second portions 192, 194 of the first support member 190. Again, with the configurations of the first support member 190 and second support member 198, the second frame side support 162 defines an elongated open-ended, generally box-shaped structural support component for both the well 130 and the vehicle body 102. End sections of the second frame side support 162 are directly secured to the first and second cross member 114, 116. The second frame side support 162 is also laterally spaced inwardly from and connected to the second side rail 112. To this end, according to one aspect, a third support member 200 of the second frame side support 162 is secured to the first portion 192 of the first support member 190. The third support member 200 interconnects the second side rail 112 and the first portion 192 and bridges a gap between the second side rail 112 and the side wall 168 of the well 130.

With continued reference to FIGS. 2 and 4, the exemplary multi-piece well 130 further includes a first frame end support 210 and a second frame end support 212 spaced longitudinally from the first frame end support 210. As depicted, the first frame end support 210 is separate from the well floor 140 and is secured to the first end 148 of the well floor base 142. The second frame end support 212 is also separate from the well floor 140 and is secured to the second end 150 of the well floor base 142. The first and second frame end supports 210, 212 define opposite end walls 216, 218 of the multi-piece well 130 (FIG. 2). Further, as shown in FIG. 2, the first and second frame end supports 210, 212 define the respective first and second cross members 114, 116, and the end sections of each of the first and second frame end supports 210, 212 are directly secured to the first and second side rails 110, 112.

Particularly, the first frame end support 210 includes a first support member 230 being L-shaped in cross-section and having a first portion 232 and a second portion 234. The first portion 232 of the first support member 230 defines one of the end walls of the well 130 (i.e., end wall 216). The first frame end support 210 further includes a second support member 240 secured to the first support member 230. The second support member 240 is also L-shaped in cross-section and has a first portion 242 spaced from and extending substantially parallel to the first portion 232 of the first support member 230 and a second portion 244 spaced from and extending substantially parallel to the second portion 234 of the first support member 230. The first and second support members 230, 240 of the first frame end support 210 together define the first cross member 114 and form an elongated open-ended, generally box-shaped structural support component for the well 130 and vehicle body 102. Front seat mounts 250 can be secured to the second portion 234 of the first support member 230.

Similarly, the second frame end support 212 includes a first support member 256 being L-shaped in cross-section and having a first portion 258 defining one of the end walls of the well 130 (i.e., end wall 218) and a second portion 260. A second support member 264 of the second frame end support 222 is secured to the first support member 256. The second support member 264 is also L-shaped in cross-section and has a first portion 266 spaced from and extending substantially parallel to the first portion 258 of the first support member 256 and a second portion 268 spaced from and extending substantially parallel to the second portion 260 of the first support member 256. Again, with the second support member 264 secured to the first support member 256, the second frame end support 212 defines the second cross member 116 of the vehicle body 100 and forms an elongated open-ended, generally box-shaped structural support component for the well 130 and the vehicle body 102.

With reference back to FIGS. 1-3, the multi-piece well 130 is positioned between the first and second side rails 110, 112. Each of the first frame side support 160 and second frame side support 162 is laterally spaced inwardly from and secured to one of the first and second side rails 110, 112 along a respective length of each first frame side support 160 and second frame side support 162. The first and second frame end supports 210, 212 at least partially form the respective first and second cross members 114, 116, and end sections of each of the first frame end support 210 and second frame end support 212 are secured to the first and second side rails 110, 112. Further, end sections of each of the first and second frame side supports 160, 162 are secured to the first and second frame end supports 210, 212 (i.e., the first and second cross members 114, 116).

With reference to FIGS. 2-4, the multi-piece well 130 further includes a separate support component 270 spanning between the first and second frame side supports 160, 162 and suspended above the well floor 140. The support component can be U-shaped in cross-section and includes end sections 272, 274 configured to releasably fastened to the respective first portions 172, 192 of the first support members 170, 190. A lid member 278 is configured to cover an opening 280 defined by the well 130, and the support component 270 is secured to an underside of the lid member 278. With the support component 270 being releasably fastened to the first and second frame side supports 160, 162, the lid member 278 can be easily removed to expose the hybrid electronic hybrid electronic equipment/hardware 132. As indicated previously, according to one aspect, the well floor 140 includes the base 142 and the platform 154 elevated relative to the base 142. In the assembled condition of the well 130, the support component 270 can be aligned with a wall 286 defining an intersection between the base 142 and the platform 154 of the well floor 140; although, this is not required. Further, the first cross member 110 and the support component 170 define seat mount locations for the pair of associated front seats 120, 122. As stated above, seat mounts 250 are secured to the second portion 234 of the first support member 230 of the first frame end support 210. A front seat mount 290 can be secured to the third support member 182 of the first frame side support 160, and a front seat mount 292 can be secured to the third support member 200 of the second frame side support 162. Each of the front seat mounts 290, 292 are laterally aligned with the support component 270. Additional front seat mounts 296 can be secured to the lid member 278 and laterally aligned with the seat mounts 290, 292.

The exemplary vehicle frame structure 102 further includes a front subframe structure 300 (see FIGS. 1 and 4) connected to the first and second side rails 110, 112 and the first cross member 114 (i.e., the first frame end support 210). As depicted, the front subframe structure 300 includes a pair of Y-shaped structural beams 302, 304. Beam 302 has one end portion 306 secured to the first cross member 114 and another end portion 308 secured to the first side rail 110. Similarly, beam 304 has one end portion 310 secured to the first cross member 114 and another end portion 312 secured to the second side rail 112. According to one aspect, the first support member 230 of the first frame end support 210 can include a recessed section 316 configured to receive the end portions 306, 310 of the respective beams 302, 304.

FIGS. 5A and 5B depict a known vehicle frame structure 320. The frame structure 320 includes a pair of laterally spaced longitudinal first and second side rails 322, 324 and cross members 326, 328, 330 spanning between and interconnecting the first and second side rails. The cross members 326, 328 are intersected by a central support member 336 which interconnects Y-shaped beams 340, 342 of a front subframe structure 344 to the cross member 330. As depicted in FIG. 5A, the vehicle frame structure 320 is configured to transfer an impact load caused by a side collision from one of the first and second side rails (the second side rail 324 in FIG. 5A) to the other of the first and second side rails (the first side rail 322 of FIG. 5A) by transferring the load through the cross members 326, 328, 330. As depicted in FIG. 5B, an impact load caused by a frontal collision is transferred from the Y-shaped beams 340, 342 to the first and second side rails 322, 324 and the central support member 336. In contrast, by providing the vehicle body 100 with the multi-piece structural well 130 for housing the hybrid electronic equipment/hardware 132, the exemplary vehicle frame structure 102 is configured such that critical load paths caused by a front impact load or a side impact load are oriented along one of the sides 166, 168 of the well and above the multi-piece well 130. Particularly, as depicted in FIG. 6A, the vehicle frame structure 102 is configured to transfer an impact load to the vehicle body 100 caused by a side collision from one of the first and second side rails 110, 112 to the other of the first and second side rails 110, 112 via the first and second cross members 114, 116 and the separate support component 270. Therefore, vehicle body stiffness for side impact is provided by the cross members 114, 116 extending between the side rails 110, 112 as well as the lateral support component 270 provided across the top of the multi-piece well 130. As depicted in FIG. 6B, the vehicle frame structure 102 is configured to transfer an impact load to the vehicle body 100 caused by a frontal collision from the first cross member 114 toward the first and second side rails 110, 112 and the first and second frame side supports 160, 162.

The present disclosure further provides an exemplary frame construction method for forming a vehicle frame structure 102. The frame construction method generally comprises providing a pair of laterally spaced longitudinal first and second side rails 110, 112; connecting a first cross member 114 to the first and second side rails 110, 112; connecting a second cross member 116 to the first and second side rails 110, 112; and forming a multi-piece structural well 130 on the vehicle frame structure 102, the multi-piece well 130 including a well floor 140, first and second side walls 166, 168 and first and second end walls 216, 218.

The forming step for the multi-piece well 130 includes securing a first frame side support 160 to a first side 144 of the well floor 140 wherein the first frame side support 160 defines the first side wall 166 of the well 130, connecting the first frame side support 160 to the first and second cross members 114, 116, securing a second frame side support 162 to a second side 146 of the well floor 140 wherein the second frame side support 162 defines the second side wall 168 of the well, and connecting the second frame side support 162 to the first and second cross members 114, 116. The forming step further includes securing a first end 148 of the well floor 140 to the first cross member 114 wherein the first cross member 114 defines the first end wall 216 of the well, and securing a second end 150 of the well floor 140 to the second cross member 116 wherein the second cross member 116 defines the second end wall 218 of the well 130. The forming step further includes fastening a separate support component 270 to the first and second frame side supports 160, 162 such that the support component 270 spans over the well floor 140.

The frame construction method further comprises connecting the first frame side support 160 to the first side rail 110; and connecting the second frame side support 162 to the second side rail 112. The exemplary frame construction method further comprises providing a lid member 278 configured to cover an opening 280 defined by the well 130, securing the support component 270 to an underside of the lid member, and providing seat mounts 250, 290, 292 for associated front seats 120, 122 on the first cross member 114 and the support component 270.

While, for purposes of simplicity of explanation, the exemplary frame construction method has steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body comprising:
   a pair of laterally spaced longitudinal first and second side rails;
   a first cross member and a second cross member longitudinally spaced from the first cross member, each of the first and second cross members spanning between and interconnecting the first and second side rails; and
   a multi-piece well configured to house associated hybrid electronic hardware including:
     a well floor having a first side, a second side laterally opposite the first side, a first end, and a second end longitudinally opposite the first end, the first end being secured to the first cross member to define a first end wall of the well, the second end being secured to the second cross member to define a second end wall of the well,
     a first frame side support secured to the first side of the well floor to define a first side wall of the well and a second frame side support secured to the second side of the well floor to define a second opposite side wall of the well, wherein the first frame side support is laterally spaced inwardly from and connected to the first side rail and the second frame side support is laterally spaced inwardly from and connected to the second side rail,
     a separate support component spanning between the first and second frame side supports and suspended above the well floor, and
     a lid member configured to cover an opening defined by the well, the support component being secured to an underside of the lid member.

2. The vehicle body of claim 1, wherein each of the well floor, the first and second frame side supports, and the first and second cross members are separate structural components of the well.

3. The vehicle body of claim 1, wherein each of the first and second frame side supports spans between and interconnects the first and second cross members.

4. The vehicle body of claim 1, further including:
   a separate first support member configured to interconnect the first frame side support and the first side rail, and
   a separate second support configured to interconnect the second frame side support and the second side rail.

5. The vehicle body of claim 1, wherein the first cross member and the support component define seat mount locations for a pair of associated front seats.

6. The vehicle body of claim 1, wherein the vehicle body is configured such that critical load paths caused by a front impact load or a side impact load are oriented along one of sides of the well and above the well.

7. The vehicle body of claim 6, wherein the vehicle body is configured to transfer an impact load to the vehicle body caused by a frontal collision from the first cross member toward the first and second side rails and the first and second frame side supports.

8. The vehicle body of claim 6, wherein the vehicle body is configured to transfer an impact load to the vehicle body caused by a side collision from one of the first and second side rails to the other of the first and second side rails via the first and second cross members and the support component.

9. The vehicle body of claim 1, wherein the end sections of the support component releasably fastened to the first and second frame side supports.

10. The vehicle body of claim 1, wherein the well floor includes a first portion and a second portion elevated relative to the first portion, the support component being aligned with a wall defining an intersection between the first and second portions of the well floor.

11. A multi-piece well for a vehicle body configured to house associated hybrid electronic hardware, the well comprising:
    a well floor having a first side, a second side laterally opposite the first side, a first end, and a second end longitudinally opposite the first end;
    a first frame end support secured to the first end of the well floor and a second frame end support secured to the second end of the well floor, the first and second frame end supports defining opposite end walls of the well, end portions of each of the first and second frame end supports being connected to respective first and second side rails of the vehicle body;
    a first frame side support secured to the first side of the well floor and the first side rail and a second frame side support secured to the second side of the well floor and the second side rail, the first and second frame side supports defining opposite side walls of the well, end portions of each of the first and second frame side supports being connected to the first and second frame end supports; and a separate support component spanning over an opening defined by the well, end portions of the support component being in direct engagement with and releasably fastened to the first and second frame side supports.

12. The well of claim 11, wherein each of the first and second frame side supports includes a separate support member configured to interconnect the first and second frame side supports with the respective first and second side rails.

13. The well of claim 11, further including a lid member configured to cover the well opening, the support component being secured to an underside of the lid member.

14. The well of claim 13, wherein the first frame end support and the support component define seat mount locations for a pair of associated front seats.

15. The well of claim 11, where the first and second frame end supports define first and second cross members of the vehicle body.

16. A method for forming a vehicle frame, comprising:
providing a pair of laterally spaced longitudinal first and second side rails;
connecting a first cross member to the first and second side rails;
connecting a second cross member to the first and second side rails; and
forming a well on the vehicle frame, the well including a well floor, first and second end walls and first and second side walls, wherein the forming step includes:
securing a first end of the well floor to the first cross member wherein the first cross member defines the first end wall of the well,
securing a second end of the well floor to the second cross member wherein the second cross member defines the second end wall of the well,
securing a first frame side support to a first side of the well floor wherein the first frame side support defines the first side wall of the well, and connecting the first frame side support to the first and second cross members,
securing a second frame side support to a second side of the well floor wherein the second frame side support defines the second side wall of the well, and connecting the second frame side support to the first and second cross members, and
fastening a support component to the first and second frame side supports such that the support component spans over the well floor;
connecting the first frame side support to the first side rail; and
connecting the second frame side support to the second side rail;
providing a lid member configured to cover an opening defined by the well, and
securing the support component to an underside of the lid member.

17. The method of claim 16, further comprising providing seat mounts for associated front seats on the first cross member and the support component.

* * * * *